Oct. 14, 1958   J. V. FREDD   2,856,257
AMPLIFYING RECORDER FOR TUBING CALIPERS
Filed Feb. 14, 1957                           4 Sheets-Sheet 1
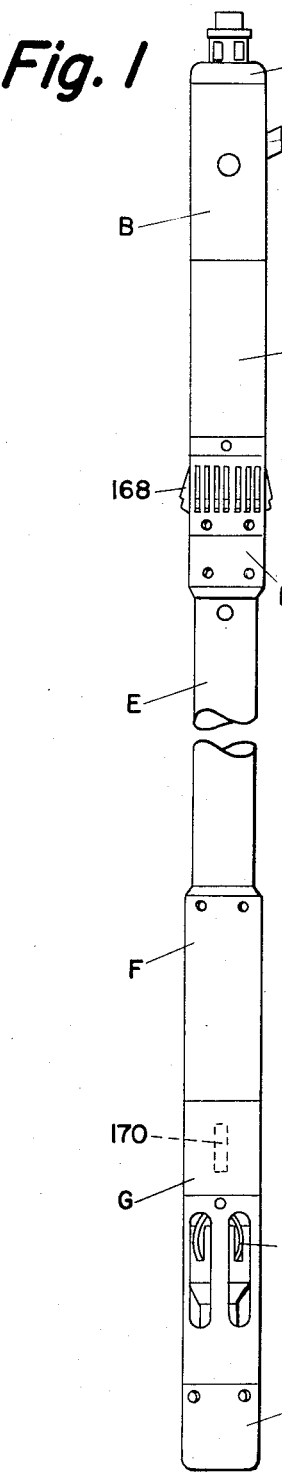
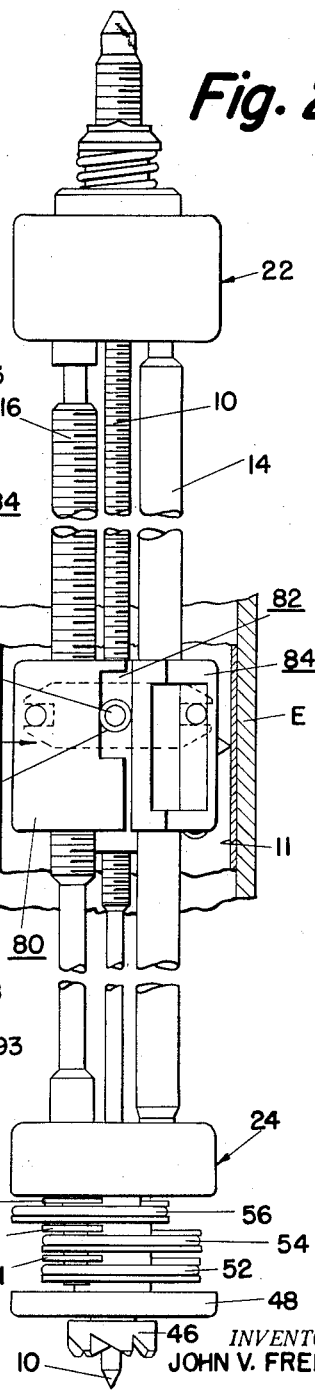
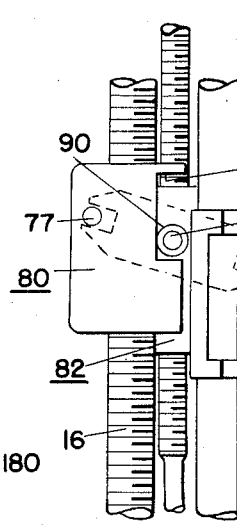
Fig. 1
Fig. 2
Fig. 12
Fig. 13
INVENTOR.
JOHN V. FREDD
BY Robert O. Spindle
ATTORNEY Oct. 14, 1958     J. V. FREDD     2,856,257
AMPLIFYING RECORDER FOR TUBING CALIPERS
Filed Feb. 14, 1957     4 Sheets-Sheet 2

INVENTOR.
JOHN V. FREDD
BY
Robert O. Spindle
ATTORNEY

Oct. 14, 1958          J. V. FREDD          2,856,257
AMPLIFYING RECORDER FOR TUBING CALIPERS

Filed Feb. 14, 1957          4 Sheets-Sheet 3

*INVENTOR.*
JOHN V. FREDD

BY Robert D. Spindle

ATTORNEY

INVENTOR.
JOHN V. FREDD
BY Robert O. Spindle
ATTORNEY

United States Patent Office 2,856,257
Patented Oct. 14, 1958

2,856,257

AMPLIFYING RECORDER FOR TUBING CALIPERS

John V. Fredd, Dallas, Tex., assignor, by mesne assignments, to Otis Engineering Corporation, Dallas, Tex., a corporation of Texas Application February 14, 1957, Serial No. 640,201

8 Claims. (Cl. 346—111)

The present invention relates in general to tube calipering devices and more particularly to the recording mechanisms which are contained in the housing of such devices and respond to the movement of the surface sensing elements in the calipering operation.

Self-contained tubing calipers of the mechanical type, as distinguished from electrical devices, normally record the movement of surface sensing elements by direct transmission to the recording elements. The chart result of this normal device is a spiral curve in which the tube surface variations are the reflection of the movement of the sensing members. Where bell crank feelers are used, for example, the movable recording element responds to the ratio of the outwardly projecting leg of the bell crank to the inwardly projecting leg. Due to physical limitations and desired sensing characteristics, the most practical design for such feeler-recorder ratio is 1 to 1. However, the record made by such limited response often lacks clarity and is not easily measured to the desired degree of accuracy. It is, therefore, an object of this invention to provide simple means for amplifying the movement of the surface sensing elements in making the tubing calipering record.

In United States Patent No. 2,708,316, issued May 17, 1955, I described and claimed an amplifying sub-assembly operating between the tubing-surface sensing elements and the recorder mechanism. It will be evident from reading that patent that such a sub-assembly requires cooperating elements and structural changes preventing universal application to existing calipers. For example, such additional mechanism could not be used in the calipers shown in my United States Patents Nos. 2,578,236; 2,596,924 and 2,637,117 without broad structural modifications.

The above-cited patents constitute a portion of the tubing calipering literature generally referred to as "mechanically operated" calipers. Such devices effect a continuous record of the internal surface configuration of the tube, on a self contained recording mechanism as the caliper passes through the tubing. These earlier calipers produce in general a record which is physically limited by the dimensions of the cooperating elements unless they include the amplifying modifications noted as part of United States Patent No. 2,708,316.

My United States Patent No. 2,777,746, issued January 15, 1957, shows an amplifying recorder for use in tubing calipers of this type and is interchangeable among those not fitted with an amplifying mechanism. The form of device disclosed in that application relies on a pulley-and-cable system integrated to form a part of the recorder mechanism drive-frame assembly and is adapted to amplify the movement of the stylus support as it moves on the recorder frame. Although generally satisfactory in operation and results, the additional pulley-and-cable elements increases the number and weight of the operating parts, shortens the length of chart on which recording could take place, and requires additional maintenance. It is a principal feature of this invention to provide a recording means adapted for interchangeable use in calipering devices of this type in which the record amplifying means is an articulated stylus support mechanism cooperating with elements of the recorder frame.

In accordance with the present invention, this mechanism comprises a stylus drive frame assembly for insertion in a tubing caliper chart chamber. This frame is adapted to rotate in the chamber by being provided with means to engage the driving mechanism with which the caliper is provided. Reciprocating means are positioned in the drive frame and are contacted by the surface sensing elements, or feelers, to receive calipering movement. The stylus assembly is an articulated device including a traveler which positionally engages the reciprocating means, a base nut on one side of the traveler and the stylus holder on the other side. Both the traveler and the stylus holder portions of the stylus assembly are maintained in sliding contact with the centrally positioned base nut. The traveler is adapted to move longitudinally of the recorder frame at a speed which maintains it at operating level with the non-reciprocable base nut. Free sliding movement of the stylus holder is allowed, however, restricted only by the physical dimensions of the device. The amplifying feature is afforded by the freely slidable stylus holder being connected to the limited moving base nut, always at exact operating level, by a lever pin-connected at the ends to the respective stylus holder and base nut. A pivotal connection, between the pin connected ends, fastens the lever to the centrally positioned reciprocable traveler. By arranging the elements of the stylus assembly in this manner and operatively regulating their positions in the chart chamber by means of the frame, the stylus will amplify the movement of the traveler body in proportion to the lengths of the lever between the pivotal point and the respective pin connected ends. The result is a chart record of the surface calipering operation amplified to show with measurable exactitude all movements of the surface sensing feelers. It is therefore a further object of this invention to provide an improved articulated recording stylus assembly in combination with a drive frame adapted to operate it which will amplify the calipering data affording more legible chart records of greater accuracy.

These and other objects will be evident from a reading of the following description of the device where reference is made to the accompanying drawings in which:

Figure 1 is an elevational view of a complete calipering device.

Figure 2 is an elevational view of the assembly of this invention.

Figures 12 and 13 show operating positions of the elements normally positioned as shown in Figure 6.

Figure 5:
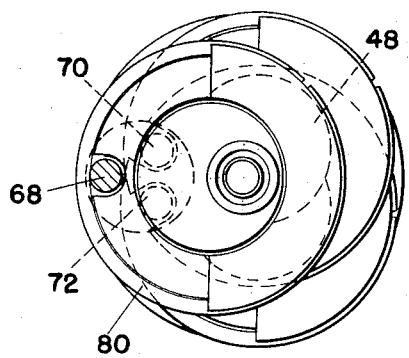
Figure 5 is a plan view of the operating base sectionalized in Figure 4 taken on line 5—5 of that figure.

To illustrate one form of caliper with which the amplifying stylus drive frame as here disclosed can be used to advantage, Figure 1 shows a completely self-contained well bore caliper of the mechanical type. For a full understanding of the complete calipering device and its operation, reference is again made to the above-noted patents. As the sub-combination here described and claimed refers only to the stylus drive frame portion of the recording mechanism, this disclosure will be confined to the recording portion of the caliper. Reference will be made, as required, to the major operating elements which actuate the recording elements, but will not include other structure. In addition to simplifying the description, this disclosure is thus limited because the stylus drive frame, as described, may be used with like calipers and similar recording mechanisms and is not devised solely as an improvement for one form of device.

Referring now to Figure 1, the top sub A is the connection by means of which the caliper is suspended in the tubing. Release assembly B is advantageously placed between the sub A and the feeler head assembly C to connect the two and to withhold the feelers 168 from the calipering operation until released by movement of dog 150. The stylus bushing assembly D operably connects the chart chamber section E to the feelers 168 whereby the reciprocating motion of the recording stylus is obtained. Section E, the chart chamber, is our main consideration as it houses the stylus drive frame of this invention, which will be described later in detail. Ratchet assembly section F, drive wheel 170, the stylus driving mechanism G with the loading wheels 180, and plug H complete the lower portion of this typical caliper. Except for general reference to these sections and the numbered elements to make clear the details and operation of the stylus drive frames disclosed here, no further reference to them will be made. The operating motions for the recording elements can be obtained from many sources. Specific operating elements are included here only by reference, and as these will not be claimed specifically, will not be discussed further.

Figure 2 is an elevational view of the assembled elements constituting the stylus drive frame and stylus assembly of this disclosure. The upper and lower portions of the drive frame are further detailed in Figures 3, 4, and 5, while Figures 6 to 11, inclusive, illustrate the stylus assembly. For purposes of orientation, the chart chamber is indicated by showing portions of the housing for section E and the chart 11 is positioned for cooperation with the stylus in Figure 2. The necessary connections to receive operating movement from the drive and sensing elements of the caliper are shown in the several views of the mechanism.

Considering first the modification to the recorder drive frame assembly necessary to operate the later-described articulated stylus assembly, reference is made to Figures 2 through 5. The rotatably fixed, reciprocable lead screw 10 is concentrically positioned relative to both the frame and stylus assemblies. Together with frame support rods 12 and 14 (Figures 10 and 11), and a second lead screw 16 distinguished from lead screw 10 by the fact that it is not reciprocable and is controllably rotatable, the upper operating assembly 22 and lower operating assembly 24, forms the drive frame. To complete this figure, the articulated stylus assembly 26 operably engaging the lead screws 10 and 16, and slidably in contact with frame rod 14, is shown positioned between the operating assemblies 22 and 24. As constructed this framework extends the full length of section E, enabling the stylus to scribe the entire surface of chart 11.

Figure 3:
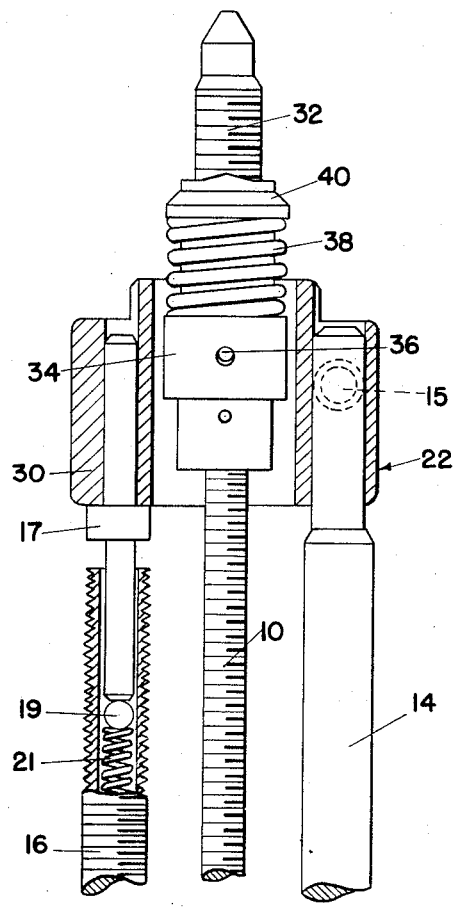
Figure 3 is an elevational view, partly in section, of the upper portion of the assembly shown in Figure 2.
Figure 10:
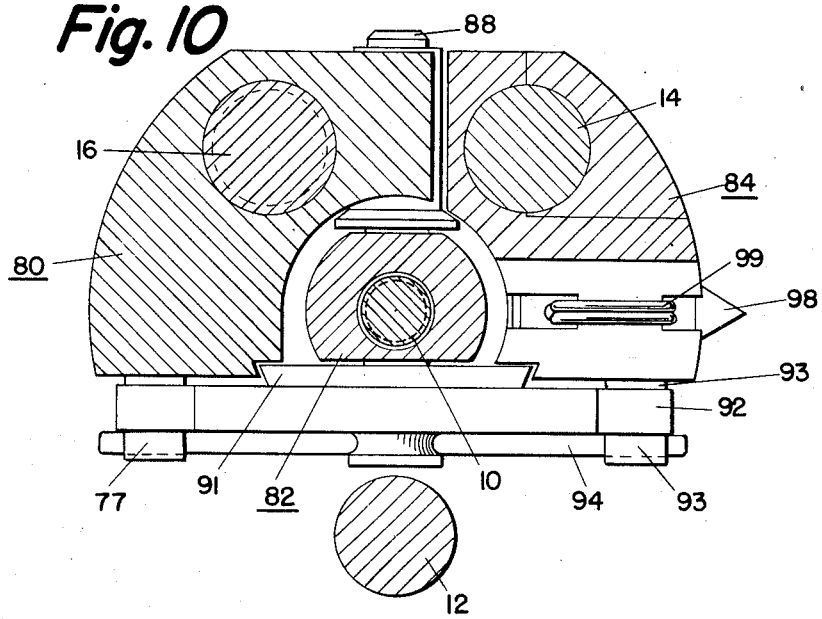
Figure 10 is a sectional view of Figure 6 taken on line 10—10.
Figure 11:
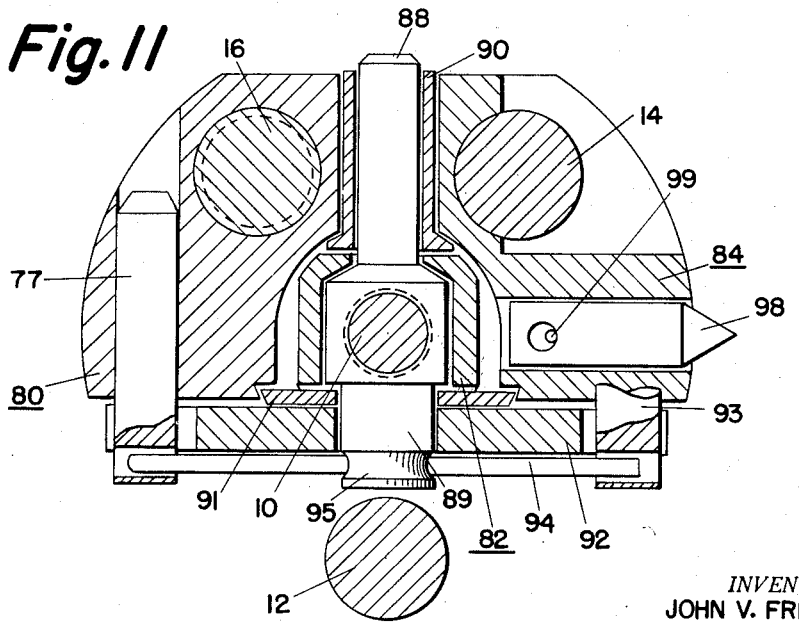
Figure 11 is a sectional view of Figure 6 taken on line 11—11.

The upper operating assembly 22 of the drive frame is shown detailed and enlarged in Figure 3. An upper end plate 30 is drilled longitudinally to position frame rods 12 and 14 in fixed position and also to position in rotatable engagement the second lead screw 16, positioned in plan as shown in Figures 10 and 11. Further distinction between the frame rods 12 and 14 and the additional lead screw 16 is made by the connections for each used in the upper assembly as shown in Figure 3. The frame rods are secured in the end plate against all movement by a set screw 15 or like means. Lead screw 16, on the other hand, is assured freedom of rotatable movement by use of a guide 17 aligning the hollowed end of the screw 16, and extending into the aperture of cap 30. Further, ball bearing 19 is inserted between the body of the screw 16 and support spring 21. A centrally positioned aperture passes reciprocable lead screw 10 to which are attached elements designed for operable engagement with elements responsive to movement of the surface sensing means. Connector screw 32 is connected to the sleeve 34 by pin 36. Guide 40 is securely fastened to the lead screw 10. Screw 32 is biased into guide 40 by spring 38 acting against sleeve 34, in turn pinned to screw 32 by pin 36 which passes through longitudinal slots in the walls of guide 40. By thus connecting lead screw 10 to the reciprocative elements of the feeler head, rotation is prevented at the same time insuring the reciprocal movement necessary to operate the recorder elements.

Figure 4:
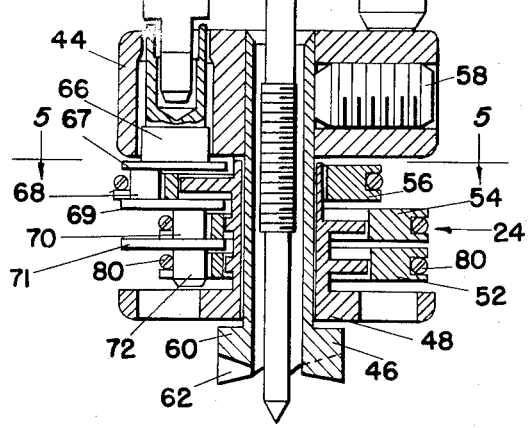
Figure 4 is an elevational view, partly in section, of the lower portion of the assembly shown in Figure 2.
Figure 6:
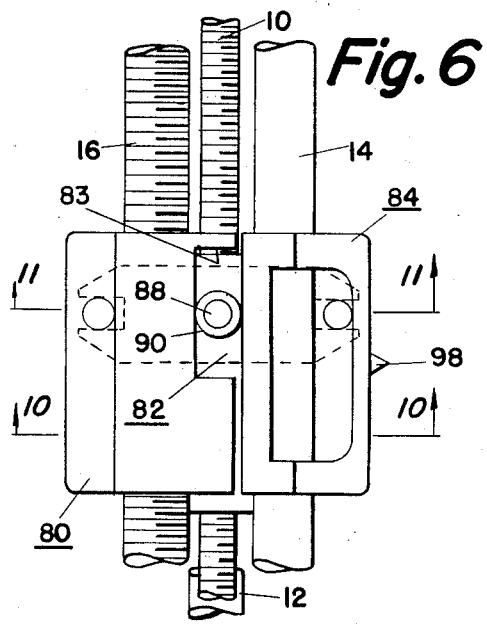
Figure 6 is an elevational view of one side of the stylus assembly shown as the central portion in assembly view Figure 2.
Figure 7:
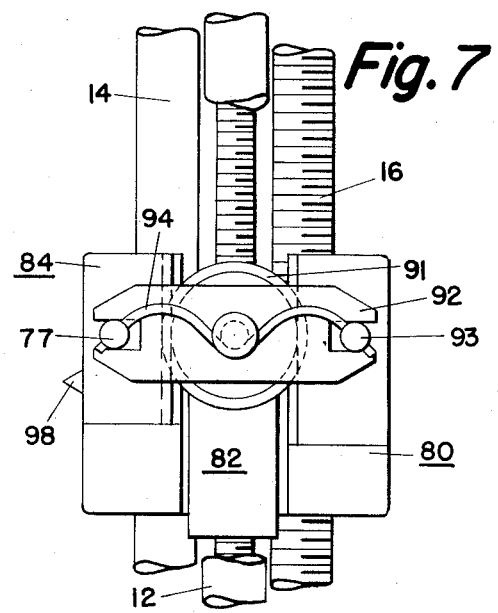
Figure 7 is an elevational view of the side of the stylus assembly opposite to that shown in Figure 6.
Figure 8:
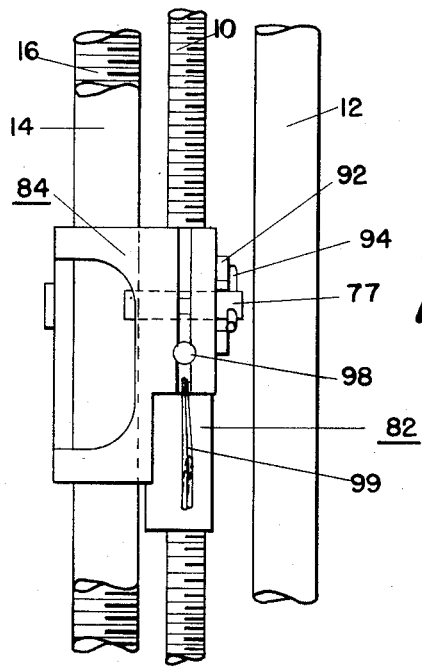
Figure 8 is an elevational view of the stylus holder portion of the stylus assembly.
Figure 9:
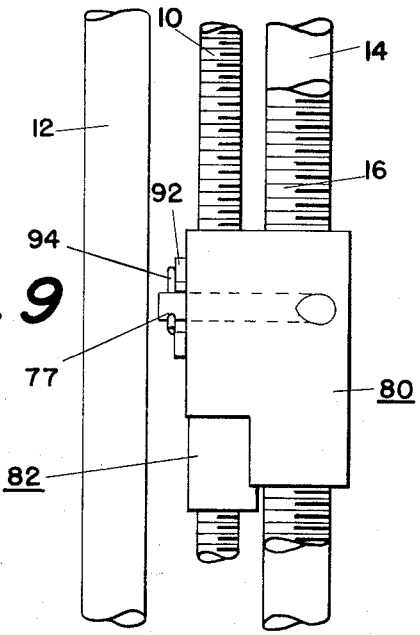
Figure 9 is an elevational view of the base nut portion of the stylus assembly.

In Figure 4 the lower assembly 24 is shown in detail and in enlarged scale. Lower end plate 44 is drilled, similarly to the above-described upper end plate 30, to receive frame rods 12 and 14 which are fastened as above, with set screws against movement. A centrally disposed aperture receives the plate shaft 46 which extends through stationary crank 48, a plurality of keeper rings shown here as three numbered upwardly respectively 52, 54, and 56, and is engaged by set screw 58 in lower end plate 44. The lower end of plate shaft 46 extends below stationary crank 48 and is upset to form a heavier portion 60 in which are fashioned teeth 62 to form one side of a driven clutch means. Stationary crank 48 embraces plate shaft 46 and engages the keeper rings in operating contact as shown in Figures 4 and 5. It will be evident by consulting the patents of reference, numbered above, that elements such as end plate 44 and plate shaft 46 and like means, form part of the driving mechanism for rotating the stylus support frame.

Provision is made in this lower assembly for both lead screws 10 and 16. The centrally disposed, non-rotating, freely reciprocating lead screw 10 is allowed to pass centrally through the lower assembly by a longitudinal aperture extending through plate shaft 46. An additional aperture is made in lower end plate 44 to receive the operating elements associated with lead screw 16. Slotted to receive a shaped portion on the lower end of the non-reciprocating, rotatably controlled lead screw 16 eccentrically positioned relative to lead screw 10 and referred to above as the second lead screw, planetary crank 66 is rotatably positioned in the lower end plate 44. A plurality of crank throw offsets shown as arcuately spaced pins 68, 70 and 72, extending from and forming the complete planetary crank 66 between spacers 67, 69 and 71, engage the stationary crank 48 against which they are held by keeper rings 52, 54, and 56 in operable relation. A clip 80 peripherally surrounds each keeper ring in a groove provided for it and passes around the keeper ring circumference to engage the cooperating pin. Each keeper ring being notched, as indicated in Figure 5, to receive its respective arcuately spaced pin on the planetary crank assembly is thus held in operating engagement by the individual keeper rings. These elements combining to controllably rotate lead screw 16 are positioned as shown in Figure 2, and sectioned in Figure 4, and seconded in Figure 4.

Referring again to Figure 2, the position and relation of the various elements described above will be clear. A check of this figure against Figures 10 and 11, yet to be described but previously mentioned, will clarify relative positions of the frame rods and lead screws not fully visible in Figure 2. Also the position of the stylus assembly which is next to be described in detail, will be preliminarily oriented. It will be further evident that the previously described sub-combination cooperates with the elements of the stylus assembly sub-combination 26 and together combine to produce an amplified record of the calipering operation. By combining these figures in this way an introduction is made to a better understanding of the operation of the device.

The stylus assembly is pictured in Figures 2 and 6 through 11. Additionally Figures 12 and 13 are added to show operating positions of this articulated device. All these figures will be used in describing the device. Basically the stylus assembly is designed to cooperate with the above-described recorder frame and by such cooperation to deliver an amplified record. To do this the stylus assembly is divided into three parts; the base nut, the traveler and the stylus holder. These parts are linked together to form an articulated combination. Further, each part of the stylus assembly utilizes a separate part of the frame for operation thus giving the separate elements the necessary cooperating, yet individual, flexibility. The base nut operably cooperates with the eccentric lead screw; the traveler cooperates with the concentric lead screw; and the stylus holder slidably engages one of the frame rods. All three sub-combinations are connected by an operating lever and fastening means.

These three parts are shown assembled in operating position in Figure 2. The base nut 80 is shown by further reference to Figures 6, 7, 9, and 10 through 13, to be of an irregular shape, tooled to extend into operating relation with the adjacent traveler 82 as shown by slot 83 enclosing traveler bushing 90. This base nut 80 is longitudinally threaded to engage the threaded eccentric lead screw 16. A laterally positioned aperture is made to receive the stylus holder pin 77 which cooperates with the amplifying lever mechanism.

Traveler 82, as the name implies, moves on the concentrically positioned non-rotatable reciprocable lead screw 10 as the frame rotates. Traveler pin 88, shaped as shown in Figure 11, extends laterally to threadedly engage lead screw 10. Additionally, this Figure 11 shows the relative positions of the traveler bushing 90 and pivotal portion 89 adapted to cooperate with the linkage which joins the separate sub-assemblies of the stylus assembly. Any reciprocation of lead screw 10 is transferred to the stylus holder 84 with which it cooperates through jointure with base nut 80 by means of lever 92 pivotally linking assemblies 80, 82 and 84 together. To complete the description of this lever linkage shown in Figure 11, and the description of other figures showing like elements, a washer 91 fits between the traveler 82 and the linking lever 92. Lever 92 is drilled to rotatably pivot on the end 89 of traveler pin 88 and is slotted on each end to pin connect the base nut 80 and the stylus holder by means of pins 77 and 93 respectively. Bow spring 94 engages a reduced diameter portion 95 on pivot portion 89 of pin 88 and enters holes in each of the pins 77 and 93 clearly shown in Figure 7.

It still remains to describe, in detail, the stylus holder sub-assembly of the stylus assembly combination. The same figures of the drawing noted above for the other sub-assemblies of this combination, namely, Figures 2 and 6 through 13, will be used in reference. Of these figures numbers 2, 12 and 13 show the sub-assembly generally and in several operating positions. Figures 6 through 11 show elevational and sectional views of the stylus holder affording better means for detailed description.

As shown in these figures, the stylus holder sub-assembly is held in operating proximity with the other sub-assemblies by frame rod 14 on which it is vertically slidable. With the exception of the connecting linkage between the several parts of the combination, specifically the pivot-pin supported lever 92 and bow spring 94, there is no physical connection between this and the other sub-assemblies. It is shaped to be free of any contact with them. In addition to the pin 93, previously mentioned, the stylus holder is apertured longitudinally for sliding engagement with frame rod 14. The stylus 98 is positioned in the holder 84 so as to scribe the chart 11 enclosing the stylus drive mechanism and is urged to contact the chart by spring 99.

A description of the operation of the recorder drive assembly, described in its several parts above, will combine the sub-assemblies of the stylus assembly and clarify the purpose of the two lead screws and their operation in the complete combination. For this purpose reference will be made to all the figures of the drawing, and particularly to Figures 2, 4, 5, 12 and 13. The presently disclosed drive frame, as previously indicated, is intended for use in known tubing calipers, as typified by the above numbered patents of reference, and will be provided with proper activation by the driving and operating elements or like means, shown in those patents. Figure 1, a copy of an assembled tubing caliper from one of these patents, shows the relative positions of the operating mechanisms and the recorder drive frame. The feeler head, section D, normally senses the tubing surface configuration and operably reciprocates the concentric lead screw 10 of this invention. Drive mechanism in section G transmitting motion through the ratchet assembly section F, is the means for rotating the drive frame through clutching engagement with plate shaft 46. Thus normal operation includes reciprocal motion of lead screw 10 transmitting feeler motion to the recording mechanism and rotation of the frame whereby a helical trace is scribed on the chart showing pits, depressions and other surface defects on the calipered tube interior.

Referring now to Figures 2 and 4, the rotation of the drive frame by clutching engagement with plate shaft 46 with the caliper driving mechanism, is obtained by fastening lower end plate 44 to the plate shaft 46 as by set screw 58. Stationary crank 48 is not rotated with the drive frame as it is not attached to plate shaft 46, but is held in fixed position being fastened against rotation as by a lug engaging an opening therein. Planetary crank 66 is thus rotated about plate shaft 46 as a center, moving the crank throws in the keeper rings which are held in operating engagement with the crank by clips 80. By this arrangement the second or eccentrically non-reciprocative lead screw 16 is controlled to rotate one complete revolution with each full revolution of the drive frame.

Continuing with reference to Figures 2 and 4, and also considering Figures 12 and 13, the cooperation of the stylus assembly with the two lead screws 10 and 16 will be discussed. The controlled rotation of lead screw 16, and its inability to reciprocate, have been fully detailed. It will be remembered further, that in contrast with these movements of the eccentrically positioned lead screw 16 the concentrically positioned lead screw 10 does not rotate but it is reciprocable. Further, the stylus assembly is vertically positioned in the drive frame by the latter-mentioned lead screw 10 as the drive frame turns the stylus assembly which is threadedly engaged thereon. Drive frame rotation thus moves the assembly vertically in proportion to the thread pitch on lead screw 10.

As the eccentric lead screw 16 forms a part of the rotating frame, the stylus assembly is maintained in normal operating position, i. e. lever 92 horizontally positioned (Figure 2), by the controlled rotation of this lead screw 16. This controlled operation was described above relative to the movement of the keeper rings and the planetary crank elements. The base nut 80, threadedly engaging lead screw 16, is positioned in relative position to the movement of the traveler 82. The lead screws 10 and 16, having threads of equal pitch, the traveler and associated stylus are maintained in a normal recording position until actuated by the calipering elements.

The controlled and cooperating vertical movement of the base nut 80 and the traveler 82, both of which are engaging the threads of their respective lead screws is extended to the stylus holder 84 by means of lever 92. Stylus holder 84 is freely slidable on frame rod 14, being positioned, vertically, solely by the cooperative action of the lead screws 10 and 16. A normal position for all these sub-combinations is shown in Figure 2. By this is meant that the reciprocal lead screw 10 is in the "dead-center" or non-operative position being unaffected by the surface sensing elements, or better, held in a non-indicating position by these elements as indicative of a non-pitted or otherwise non-affected interior tubular surface. Movement of lead screw 10 in either direction, however, as shown in Figures 12 and 13, affects the relative positions of the separate sub-assemblies.

In these figures base nut 80 does not deviate from the normal operating position which is maintained, relative to lead screw 10, by the controlled rotation of like-pitched lead screw 16. Traveler 82 and stylus holder 84 are, however, moved vertically in response to the reciprocation of lead screw 10. Traveler pin 88, moved vertically in response to lead screw 10 reciprocation, pivots lever 92 about the relatively vertically fixed pin 77 of the base nut 80. Movement of freely slidable stylus holder 84 is then in proportion to the distances between pivot 88 and pins 77 and 93, respectively. As this distance shown here is in the ratio of 1 to 1, longitudinal movement of the reciprocable lead screw relative to the drive frame results in a two-fold magnification of the stylus holder movement. Further, the movement of the stylus holder is in the same direction as that of the lead screw and the traveler sub-assembly mounted thereon.

The disclosed multiplying elements forming a part of and being operated by the drive frame combination as improved, is readily usable in the caliper assemblies referred to above, and in like devices. Changes in positions of the elements and in dimensions controlling their operation and results will be evident to those versed in the art. It is the intention of the inventor that all such mechanical rearrangements and variations in dimensions not amounting to invention, as well as all other changes coming within the meaning and equivalency range of the appended claims are intended to be embraced herein.

I claim:

1. A recorder drive frame and stylus combination for use in a tubing caliper comprising a frame of spaced rods maintained in operating relation by upper and lower end plates; a rotatably fixed, longitudinally reciprocable concentrically positioned lead screw, a traveler assembly operably engaging the concentric lead screw, lever means pivotally connected to the traveler assembly, a rotatable non-reciprocating eccentrically located lead screw extending between the end plates parallel and adjacently cooperative with the concentric lead screw, threaded means operably engaging said eccentric lead screw pin connected on one end of the pivotal lever means to maintain said lever means at a normal recording position throughout the recording operation, stylus means operably engaged by the other end of the lever means reciprocable in an amplified recording movement in response to the reciprocation of the concentric lead screw.

2. A recorder for use in a self-contained mechanically operated tubing caliper comprising, in combination with an enclosing chart, a rotatable drive frame positioned concentrically of the chart and of a length to cooperate therewith, a concentric lead screw extending the length of the frame being longitudinally reciprocable and rotatably stationary relative to the frame, an eccentric lead screw supported by said frame adjacent the concentric lead screw, means cooperating with said frame to rotate said eccentric lead screw in the frame at a rate coordinating the screw travel thereof in operating relationship with the travel of the concentric lead screw as said frame rotates, stylus support means operably engaging the concentric lead screw, a stylus adjacent and vertically movable relative to the support means, and lever means pivotally connected to the support means and operably engaging the stylus and the eccentric lead screw whereby the movement of the concentric lead screw transmitted to the stylus is amplified.

3. The recorder defined in claim 2 further characterized by the means cooperating with the frame to rotate the eccentric lead screw including a crank formed extension of said lead screw in operable engagement with the rotatable drive frame whereby one revolution of the drive frame rotates the eccentric lead screw the required degree in the desired direction by rotating the crank extension.

4. An amplifying stylus assembly for use in a chart positioning chamber of a mechanically operated tubing caliper comprising a rotatable frame of spaced rods positioned by upper and lower end plates, a concentric lead screw extending the length of the frame being longitudinally reciprocable and rotatably stationary relative to the frame; an eccentrically positioned lead screw reciprocably fixed and rotatably movable relative to the frame; a traveler adapted to engage the concentric lead screw and move the stylus assembly vertically, a stylus holder portion slidably engaging one of the spaced rods of the frame and independently movable relative to the traveler portion of the assembly, and a base nut operatively positioned to cooperate with the traveler and stylus holder portions of the stylus assembly and to engage the eccentric lead screw; lever means pivotally mounted by the traveler portion and linking the stylus holder and base nut to amplify the reciprocable movement of the concentric lead screw as it affects the stylus holder; and means in the lower end plate responsive to the rotatable movement of the frame to rotate the eccentric lead screw relative to the concentrically positioned lead screw, thereby elevationally positioning the base nut relative to the traveler.

5. A recorder for use in a self-contained mechanically operated tube caliper comprising, in combination with an enclosing chart, a drive frame positioned concentrically of the chart and of a length to cooperate therewith, a non-rotating, reciprocable lead screw concentrically positioned to extend the length of the drive frame, a traveler in relative rotating engagement with the lead screw, a stylus holder adjacent the traveler and slidably engaging the drive frame in operating contact, being vertically movable relative thereto, and means to amplify the reciprocable movement of the lead screw as transmitted to the stylus holder including a base nut operably positioned adjacent the traveler, an eccentric lead screw adapted to rotate with the frame and also independently thereof to elevationally position the base nut in normal operating relationship with the traveler in said frame, and a lever pivotally suspended between its ends on said traveler and engaging pins at the lever ends respectively connected to the stylus holder and the base nut, the relationship of distance between the pivot and the respective pins determining the amplification of stylus movement over the distance of reciprocation of the concentric lead screw.

6. A recorder for use in a self-contained mechanically operated tube caliper comprising a cylindrically arranged chart, top and bottom plates, a frame of spaced rods operably positioned by the top and bottom plates for concentric rotation in said chart, a non-rotating threaded lead screw concentrically mounted relative to said frame extending between the top and bottom frame assemblies and longitudinally reciprocable relative thereto, a non-reciprocating threaded lead screw eccentrically mounted relative to the concentric lead screw, means operably cooperating with the eccentric lead screw and the bottom plate rotating said eccentric lead screw in direct proportion to the rotation of the frame, a lever pivotally mounted at the mid-point and adapted to threadedly engage the concentric lead screw, a stylus supported on one end of the lever, and vertically movable means cooperatively engaging the rotatable eccentric lead screw engaging the end of the lever opposite the stylus supporting end in fixed operating relation with the pivot mounting of the lever.

7. In a stylus assembly for use with a recorder frame having a non-rotatable reciprocable concentrically positioned lead screw and an eccentric rotatable non-reciprocable lead screw of equal pitch and a plurality of frame rods, all positioned between end plates, comprising a traveler means cooperably engaging the concentric lead screw for reciprocation therewith and rotation thereon as the frame rotates, a stylus support adjacent said traveler means in slidable engagement with a frame rod, a base nut engaging the eccentric lead screw and vertically movable in the frame in response to the rotation thereof a distance equal to the vertical movement of the traveler means and a lever pivotally connected to the traveler means and the ends extended to engage pins on the stylus support and base nut respectively.

8. In a recorder drive frame for use in tubing caliper devices wherein both a concentric and an eccentric lead screw positioned between end plates are required to cooperate in vertically positioning the stylus assembly in the frame and the eccentric lead screw is further required to rotate independently of the frame, the improvement in said frame for rotating the eccentric lead screw comprising a rotatable crank having a plurality of throw offsets therein extending into operating engagement with the eccentric lead screw through an aperture in one of said end plates thereby positioning said rotatable crank, a plurality of keeper rings engaging each of the throw offsets of the rotatable crank, a stationary crank eccentrically machined to secure and hold the separate keeper rings in operating position relative to the rotatable crank and fastening means to keep the stationary crank from rotating whereby rotation of the rotatable crank positioning end plate rotates the rotatable crank and the connected eccentric lead screw.

References Cited in the file of this patent

UNITED STATES PATENTS

| 908,867 | Jerauld | Jan. 5, 1909 |
| 2,637,117 | Fredd | May 5, 1953 |